May 31, 1966     T. F. PETERS     3,253,509

REMOTELY CONTROLLED NON-GLARE REAR VIEW MIRROR

Filed May 11, 1962     2 Sheets-Sheet 1

INVENTOR.
Theodore F. Peters
BY
Paul J. Reising
ATTORNEY

May 31, 1966     T. F. PETERS     3,253,509
REMOTELY CONTROLLED NON-GLARE REAR VIEW MIRROR
Filed May 11, 1962     2 Sheets-Sheet 2

INVENTOR.
Theodore F. Peters
BY
Paul J. Reising
ATTORNEY 3,253,509
REMOTELY CONTROLLED NON-GLARE
REAR VIEW MIRROR
Theodore F. Peters, Dearborn, Mich., assignor to General Motors Corporation, Detroit, Mich., a corporation of Delaware
Filed May 11, 1962, Ser. No. 194,038
8 Claims. (Cl. 88—77)

This invention concerns a non-glare or anti-glare rear view mirror and more particularly relates to the operating mechanism for remotely adjusting the position of the mirror.

Non-glare mirror assemblies are well known in the art and may comprise, for example, a single prismoidal mirror body having a reflective coating on its rear surface to provide the highly intense image in the "day" position, and a less reflective front surface angularly related relative to the rear surface to provide the image of reduced intensity with the mirror in its non-glare or "night" position. The same result may be obtained with a mirror assembly having two distinct mirror elements or bodies angularly disposed relative to each other, with the respective elements providing images of different intensities.

Mirror assemblies of the type described above have been extensively used inside a vehicle and are associated with appropriate operating mechanism for presenting the desired reflecting surface to the vehicle operator. In most instances a lever or the like is mounted adjacent the mirror assembly and by manually actuating the lever, the vehicle operator is able to tilt or move the non-glare mirror surface into his line of vision and thereby substantially eliminate the headlight glare of a following vehicle during night time driving. Although this arrangement has removed the objectionable glare from the inside mirror, heretofore no comparable operating mechanism of simple and durable construction has been proposed for selectively presenting a non-glare surface on the outside rear view mirror.

Accordingly, one object of the present invention is to provide an outside mirror with two reflecting surfaces and remotely located actuating means for selectively presenting one of the surfaces to the vehicle operator.

Another object of the present invention is to provide an outside mirror with an operating mechanism for adjusting the mirror about mutually perpendicular axes and for selective positioning of the mirror between a "day" and "night" position by a remotely located actuator.

The above and other objects are accomplished with a mirror mechanism made in accordance with the invention and which includes a housing that carries a mirror support for selective adjustment of the latter about mutually perpendicular pivot axes. A prismoidal mirror having two reflecting surfaces of different reflecting power is mounted in the mirror support with the latter connected through operating mechanism to a remotely located actuator that includes a first and second rotatable knob. Individual rotation of each of the knobs positions the mirror support about one of the axes while axial movement of one of the knobs causes the mirror mechanism to tilt the mirror a predetermined angle so as to move the latter from a "day" to a "night" position, and vice versa.

A more complete understanding of this invention may be derived from the following description when taken in conjunction with the drawings in which.

Figure 1:
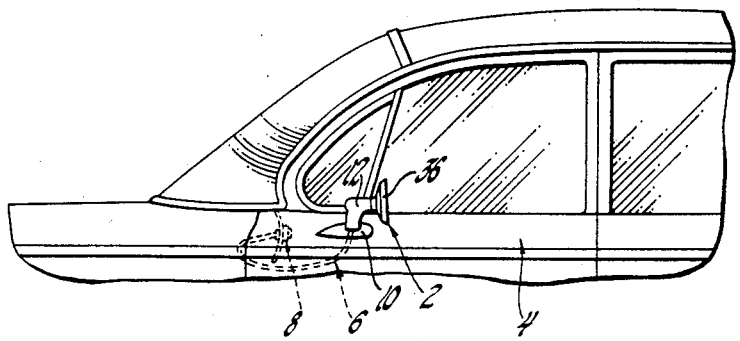
FIGURE 1 shows a mirror mechanism incorporating the present invention and located on the outside of a vehicle door.

Referring to the drawings and more particularly to FIGURE 1, a mirror mechanism 2 incorporating the subject invention is shown mounted on the outside surface of a vehicle door 4 and includes a cable 6 composed of the conventional sheath and wire connecting the mirror mechanism to an actuator 8. The actuator is disposed inside the vehicle and is adapted to be positioned on the instrument panel, the vehicle door, or any other position which is readily accessible to the vehicle operator for convenient manual operation of the actuator.

Figure 2:
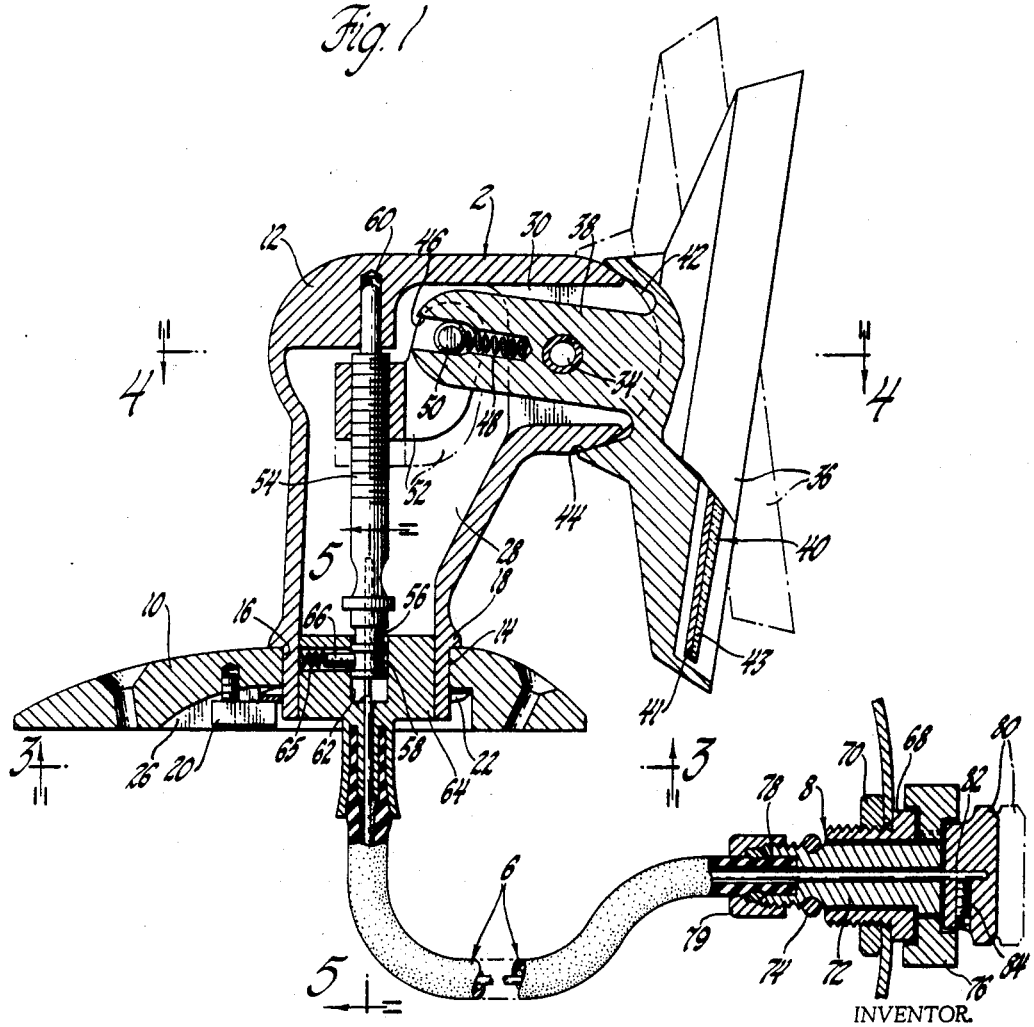
FIGURE 2 is an enlarged view of the mirror of FIGURE 1 taken on a vertical section and showing the connection means between the mirror mechanism and an actuator.
Figure 3:
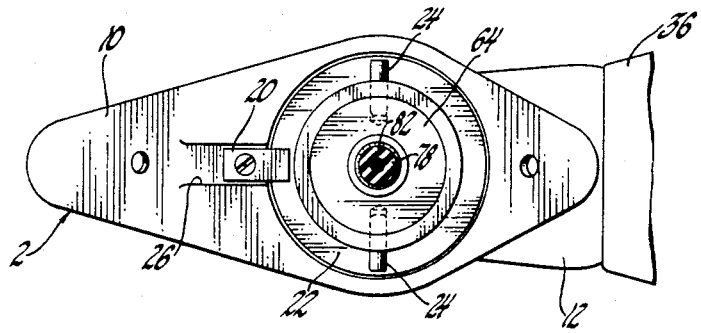
FIGURE 3 is a section taken on lines 3—3 of FIGURE 2.
Figure 4:
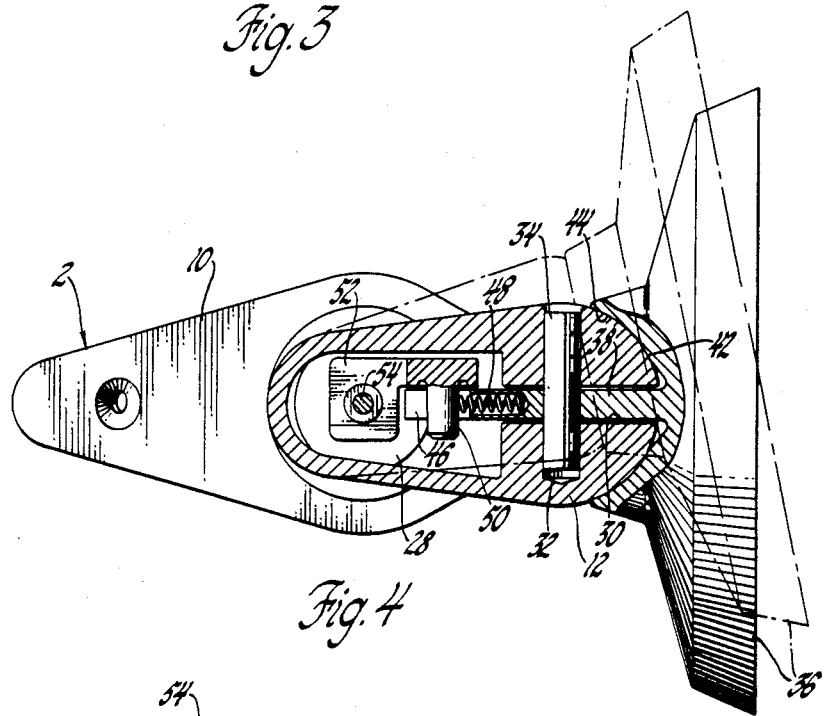
FIGURE 4 is a section taken on lines 4—4 of FIGURE 2.
Figure 5:
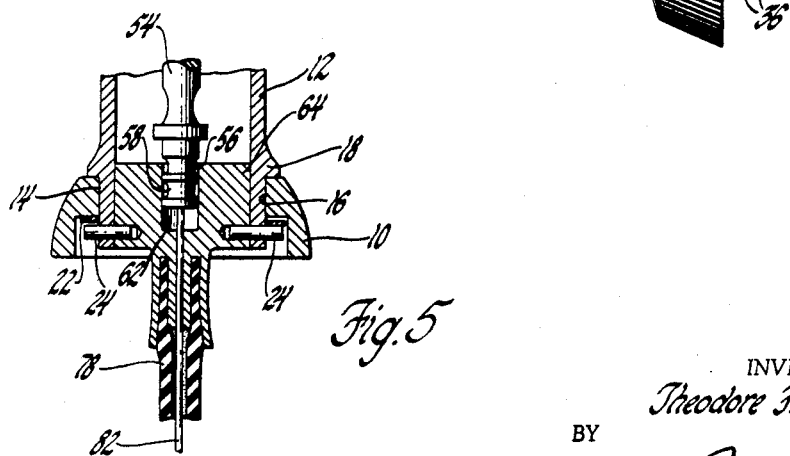
FIGURE 5 is a section taken on lines 5—5 of FIGURE 2.

As shown in FIGURES 2 through 5, the mirror mechanism 2 comprises a mounting bracket 10 including appropriate bores for accommodating fasteners which secure the bracket to a mounting surface such as the sheet metal of the door 4. A housing 12 has a cylindrical bearing surface 14 that extends into an enlarged bore 16 formed in the bracket 10. An annular shoulder 18 is formed above the bearing surface so as to rotatably support the housing on the bracket together with a rectangular lock member 20 which is fixed to the underside of the bracket by a screw. One end of the lock member is engageable with a washer 22 that is interposed between the bracket 10 and a pair of radially extending pins 24, as shown in FIGURES 3 and 5, while the other end is set in a channel 26 which prevents the lock member from turning when the housing is rotated.

The housing 12 includes an enlarged cavity 28 that opens at its upper end in the form of an axially extending narrow slot 30. A transverse bore 32 is formed in the upper portion of the housing as shown in FIGURE 4, and serves to accommodate a pivot pin 34 about which a mirror support 36 is pivotally carried by an integral tongue or projection 38 which extends rearwardly from the mirror support into the narrow slot. A prismoidal mirror 40 is mounted in the mirror support and includes the usual pair of reflecting surfaces of different reflecting power having a highly reflective coating 41 substantially coextensive with the rear surface of the mirror to provide an intense image in the normal or "day" position of the mirror support. The front surface 43 is uncoated or otherwise rendered less reflective than the rear surface to provide a front surface image reflection of reduced intensity when the mirror support is disposed in the non-glare or "night" position, as will be explained hereinafter. The terminal portion 42 of the housing is formed in a semi-spherical shape with a complementary bearing surface 44 formed on the mirror support 36 to permit the latter to freely move about the pivot pin while maintaining continuous surface contact with the housing, as shown in FIGURE 2. The free end of the tongue 38 terminates with an elongated slot 46 formed therein, having one portion thereof narrow in width and accommodating a coil spring 48. The other portion of the slot 46 is slightly larger than the first portion for slidably carrying a pin 50 integrally formed with a connecting member 52 and continuously biased by the coil spring. A control rod 54 is vertically positioned within the housing 12 and has a portion thereof threaded into operative engagement with the connecting member while the lower end thereof is formed with two vertically spaced annular grooves 56, 58. The upper end of the control rod extends into a bore 60 located in the housing wall with the lower end rotatably and slidably supported within a bore 62 centrally disposed in a plug member 64. The plug member is rigidly secured to the lower portion of the housing 12 by the aforementioned pins 24 and includes an opening 65 having an axis normal to the axis of the bore 62 for housing a spring bias detent 66 that cooperates with the grooves 56, 58 in the control rod for holding the latter in one of two vertical positions.

The actuating mechanism 8 comprises a primary threaded sleeve member 68 secured to the sheet metal of an instrument panel by a nut 70, and rotatably supporting a secondary sleeve member 72. Axial movement of the member 72 relative to the primary sleeve member is restricted by a ring-type washer 74 seated within an annular groove in the body of the sleeve member 72 and a knob 76 keyed to one end thereof. One end of the sheath 78 of the operating cable 6 is non-rotatably secured to the sleeve member 72 by a clamping arrangement including a nut 79. A second knob 80 is connected to one end of a flexible wire 82 by a set screw 84 and has a forward portion that extends into an annular well formed in the knob 76. The wire passes freely through the sheath portion 78 and is rigidly connected at the opposite end with the control rod 54 while the opposite end of the sheath 78 is rigidly fixed to the plug 64.

In adjusting the mirror 40 for the desired rearward view, the vehicle operator turns either knob 76 or 80 for respectively moving the mirror support about a vertical or horizontal pivot axis. When the knob 80 is rotated, the wire connection between the knob and the control rod 54 causes the latter to rotate about its longitudinal axis with resultant threading of the connecting member 52 along the length of the rod which movement acts through the pin and slot connection between the connecting member and tongue 38 to pivot the mirror support about the transverse pin 34. Similarly, rotation of the knob 76 produces corresponding rotation of the sheath 78 and the plug member 64 which in turn is fixed to the mirror housing 12. Thus, the entire mirror housing, including the mirror support, rotates within the bore 16 about a vertical axis and provides for sidewise mirror adjustment in this manner.

When the mirror is adjusted for the desired rearward reflection, and should the daytime reflecting surface lie in the operator's line of vision, the operator need only move the knob 80 axially from the position shown in full lines in FIGURE 2 to that shown in phantom lines to obtain the night-time reflecting surface. This movement draws the wire which in turn shifts the control rod downwardly into the lower portion of the bore 62 thereby causing the associate mirror support to tilt downwardly a predetermined distance. When this occurs, the yieldable detent 66 is initially retracted against the bias of the spring and then moves into mating engagement with the groove 56 of the control rod to hold the latter and the associated components in the new position which can be considered the night-time position of the mirror support. It should be apparent that to revert to the original setting of the mirror support, the knob 80 is returned to the full line position of FIGURE 2 by pushing inwardly on the knob. The wire being of a type that acts in tension and compression permits the inward movement of the knob to shift the control knob upwardly in the respective bores 60 and 62 so as to move the groove 58 into mating engagement with the detent. Again in this position, the various parts of the mirror mechanism are firmly held by the detent so as to prevent the normal shocks occasioned by a moving vehicle from causing the mirror to move out of adjustment.

Although only one embodiment of the present invention has been shown, it should be understood that the inventor contemplates various changes and modifications in this mirror mechanism that can be made without departing from the spirit of the invention and, therefore, he does not intend to be limited except by the scope of the appended claims.

What is claimed is:

1. A remotely controlled mirror comprising a bracket, a housing rotatably mounted in the bracket, a mirror support pivotally carried by the housing, a mirror having two reflecting surfaces of different reflecting power rigidly mounted in the mirror support, and remotely located actuating means including a rotatable first and second knob means operatively connecting the respective knobs with the housing and mirror support and permitting movement of the mirror about a pair of mutually perpendicular pivot axes upon rotation of said knobs, the second knob being mounted for axial movement, and means including said last mentioned means permitting axial movement of the second knob to tilt the mirror between two predetermined positions to selectively present one of said two reflecting surfaces to produce the desired image.

2. A remotely controlled mirror comprising a bracket, a housing upstanding from the bracket and being rotatably supported thereby, a mirror support having a projection with a portion thereof pivotally connected to the free end of the housing about a first pivot axis, a threaded control rod rotatably and slidably supported in the housing, first means connecting the control rod with the mirror support, a mirror having two reflecting surfaces of different reflecting power rigidly mounted in the mirror support, operating means located remotely of the mirror and including a first and second knob, second means connecting the first knob with the control rod so that rotation of said first knob pivots the mirror support about said first pivot axis and axial movement of the first knob causes sliding movement of the control rod, third means connecting the second knob to the housing so that rotation of the second knob moves the mirror support about a pivot axis perpendicular to said first pivot axis, and yieldable detent means operatively associated with the control rod for limiting sliding movement of the latter between two fixed points so that axial movement of said first knob permits the mirror support to shift between two predetermined positions to selectively present either of said reflecting surfaces to produce the desired image.

3. A remotely controlled mirror comprising a bracket, a housing upstanding from the bracket and being rotatably supported thereby, a mirror support having an integral projection with an intermediate portion thereof pivotally connected to the free end of the housing about a first pivot axis, a threaded control rod rotatably and slidably supported in the housing, first means connecting the control rod with the mirror support, a mirror having two reflecting surfaces of different reflecting power rigidly mounted in the mirror support, operating means located remotely of the mirror and including a first and second knob, second means connecting the first knob with the control rod so that rotation of the first knob moves the first means along the rod to pivot the mirror support about said first pivot axis and axial movement of the first knob causes sliding movement of the control rod, third means connecting the second knob to the housing so that rotation of the second knob moves the mirror support about a pivot axis perpendicular to said first pivot axis, and yieldable detent means operatively associated with the control rod for limiting sliding movement of the latter between two fixed points so that axial movement of said first knob permits the mirror support to shift between two predetermined points to selectively present either of said reflecting surfaces to produce the desired image.

4. A remotely controlled mirror comprising a bracket, a housing upstanding from the bracket and being rotatably supported thereby, a mirror support having an integral projection with an intermediate portion thereof pivotally connected to the free end of the housing about a first pivot axis, a threaded control rod rotatably and slidably supported in the housing, a pin and slot connection joining the control rod with the mirror support, a spring interposed between the pin and the mirror support, a mirror having two reflecting surfaces of different reflecting power rigidly mounted in the mirror support, operating means located remotely of the mirror and including a first and second knob, second means connecting the first knob with the control rod so that rotation of the first knob moves the first means along the rod to pivot the mirror support about said first pivot axis and axial movement of the first knob causes sliding movement of the control rod, third means concentric with the second means and connecting the second knob to the housing so that rotation of the second knob moves the mirror support about a pivot axis perpendicular to said first pivot axis, and yieldable detent means carried by the housing and coacting with the control rod for limiting sliding movement of the latter between two fixed points so that axial movement of said first knob permits the mirror support to shift between two predetermined positions to selectively present either of said reflecting surfaces to produce the desired image.

5. The device of claim 4 wherein the control rod has spaced keeper means for receiving the detent means.

6. A remotely controlled mirror comprising a bracket, a housing connected to said bracket, a mirror support, a mirror having two reflecting surfaces of different reflecting power rigidly mounted in the mirror support, means including said housing for supporting said mirror support for pivotal movement about a substantially vertical axis and a substantially horizontal axis, remotely located operating means, means operatively connecting said mirror support with said operating means whereby actuation of the latter results in selective movement of the mirror support about each of said axes, and detent means operatively associated with said last-mentioned means and said operating means for permitting said mirror support to be shifted between two predetermined fixed positions about said horizontal axis to selectively present either of said reflecting surfaces to produce the desired image.

7. A remotely controlled mirror comprising a bracket, a housing connected to said bracket, a mirror support, a mirror having two reflecting surfaces of different reflecting power rigidly mounted in the mirror support, means including said housing for supporting said mirror support for pivotal movement about a substantially vertical axis and a substantially horizontal axis, remotely located operating means adapted for rotation and axial movement, means operatively connecting said mirror support with said operating means whereby rotative movement of the latter results in selective movement of the mirror support about each of said axes, and detent means operatively associated with said last-mentioned means whereby axial movement of said operating means permits said mirror support to be shifted between two predetermined fixed positions about said horizontal axis to selectively present either of said reflecting surfaces to produce the desired image.

8. A remotely controlled rear view mirror comprising a bracket, a housing mounted on the bracket, a mirror support carried by said housing for movement about a substantially horizontal axis and a substantially vertical axis, a prismoidal mirror having two reflecting surfaces of different reflecting power rigidly mounted in the mirror support, operating mechanism connected to said housing and said mirror support and adapted to position the latter about said axes, said operating mechanism including a member supported for rotation and operatively connected to the mirror support, detent means supporting said member for shifting movement between two predetermined fixed points, a remotely located actuator, a flexible cable, one end of the flexible cable connected to the actuator and the other end connected to said member so that rotation of the actuator results in adjustment of the mirror support to an infinite number of positions between angularly spaced limits about said horizontal axis and axial movement of the actuator permits said member to shift between said fixed points with corresponding shifting movement of the mirror support about said horizontal axis to selectively present either of said reflecting surfaces to produce the desired image.

References Cited by the Examiner
UNITED STATES PATENTS

| | | | |
|---|---|---|---|
| 2,315,260 | 3/1943 | Lancaster | 88—98 |
| 2,573,127 | 10/1951 | Bredow. | |
| 2,588,792 | 3/1952 | Barkley | 88—77 |
| 2,674,922 | 4/1954 | Robinson | 88—98 X |

JEWELL H. PEDERSEN, *Primary Examiner.*

J. K. CORBIN, *Assistant Examiner.*